Oct. 22, 1929.    S. OLSON    1,732,376
DISCHARGING DEVICE FOR CONVEYERS
Filed June 30, 1927    2 Sheets-Sheet 1
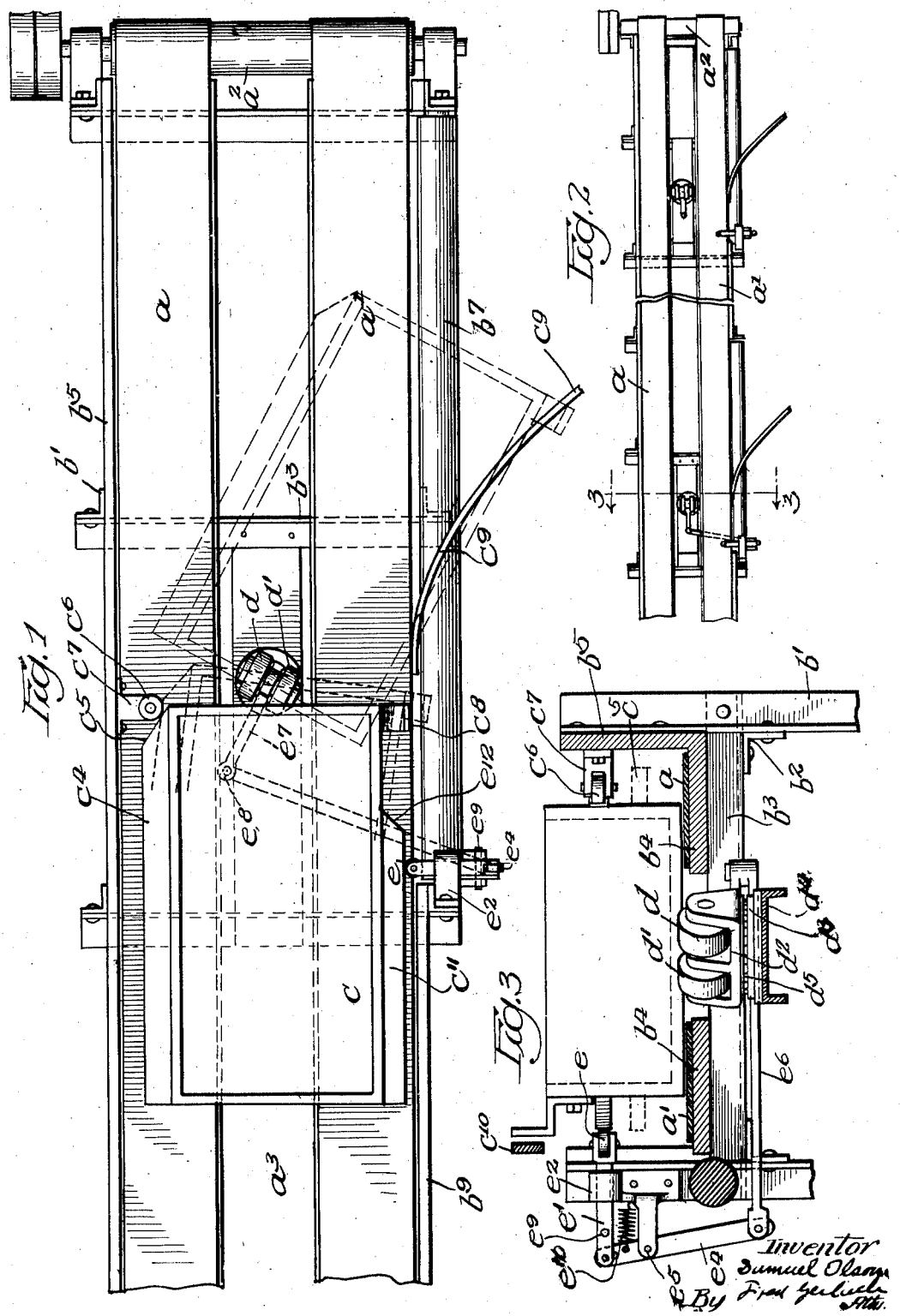

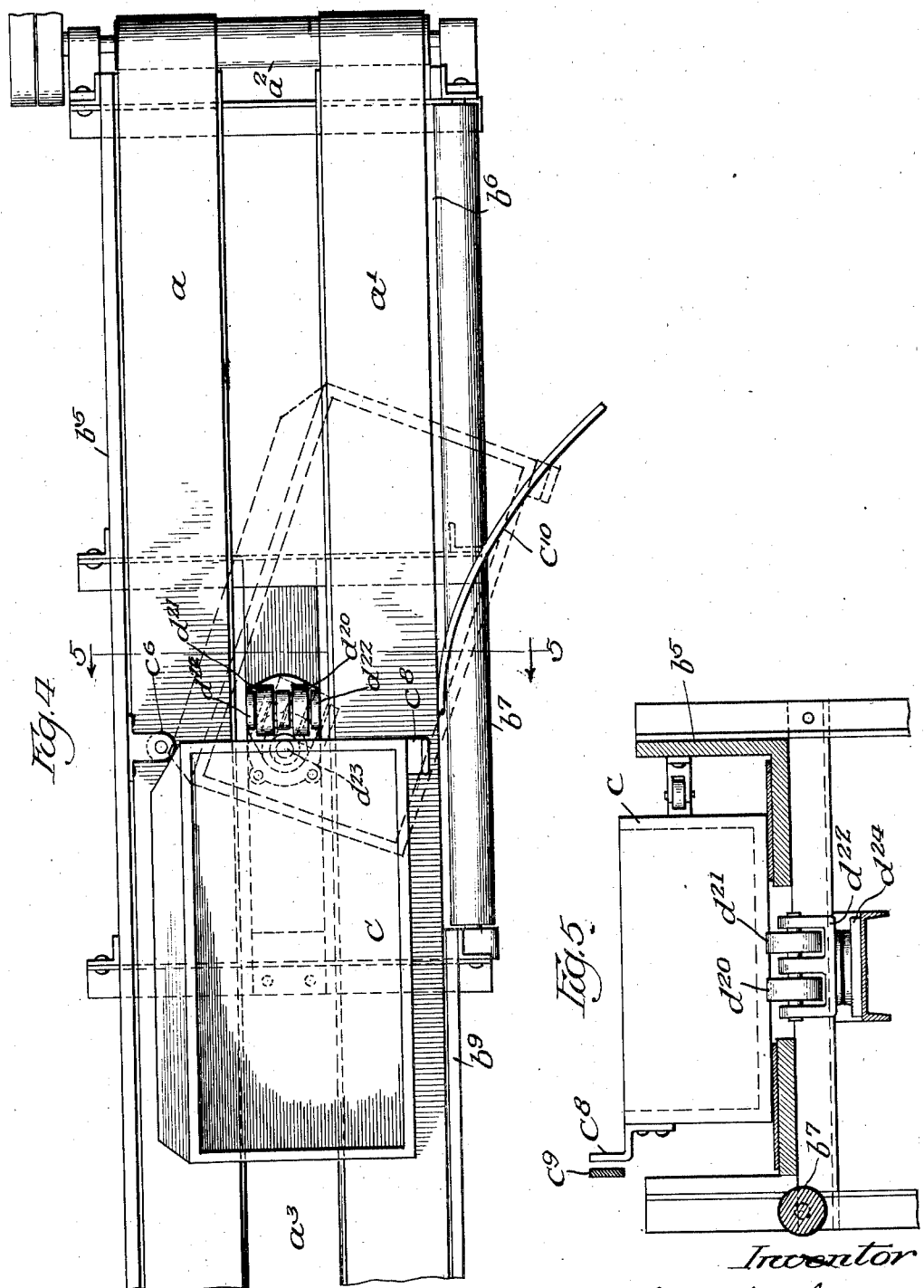

Patented Oct. 22, 1929

1,732,376

UNITED STATES PATENT OFFICE

SAMUEL OLSON, OF CHICAGO, ILLINOIS, ASSIGNOR TO SAMUEL OLSON & COMPANY, OF CHICAGO, ILLINOIS, A CORPORATION OF ILLINOIS

DISCHARGING DEVICE FOR CONVEYERS

Application filed June 30, 1927. Serial No. 202,503.

The invention relates to discharging devices for conveyers.

In the type of device exemplified in Patent No. 1,504,705 dated Aug. 12, 1924 for switching or discharging load-carriers, such as boxes, from endless conveyers, it frequently occurs that the box-bottoms become torn or acquire sharp points which will tear or wear the belt, particularly during relative lateral movement between the boxes and the belt which occurs in the discharging operation of the boxes. When the belts are of considerable length, the cost of replacing them is great.
The primary object of the present invention is to provide an automatic discharging device for the load carriers which will overcome this cutting, tearing, or wearing of the conveyer-belt and to effect a considerable saving in the cost of maintenance which heretofore resulted from the necessity of replacing the belt when it became torn or worn. This object is attained by providing means to automatically lift the carriers off the belt during their lateral discharge.

Other objects of the invention will appear from the description of the devices exemplifying the invention.

The invention consists in the several novel features hereinafter set forth and more particularly defined by claims at the conclusion hereof.

In the drawings: Fig. 1 is a plan of a conveyer system embodying the preferred form of the invention. Fig. 2 is a plan of a portion of the system on a smaller scale. Fig. 3 is a transverse section on line 3—3 of Fig. 2. Fig. 4 is a plan of a modified form of the invention. Fig. 5 is a transverse section on line 5—5 of Fig. 4.

The invention is exemplified in a conveyer embodying a pair of horizontally travelling endless belts $a$ and $a'$, of sufficient length to deliver the load-carriers to different discharge stations. These belts are spaced apart to leave a longitudinally extending space $a^3$ between them and they pass around pulleys or rollers $a^2$, one of which is driven in any suitable manner to drive the belts synchronously. The rollers are carried by a suitable frame composed of standards $b'$, cross-bars $b^3$ and longitudinal bars $b^2$, secured together to form a rigid supporting structure. The upper reach of each belt travels over a bed $b^4$, to suitably support the load carriers $c$ in transit to the discharge-stations. These beds are supported by the standards $b'$. Adjacent the outer margin of the belt $a$, there is provided a continuously extending side wall $b^5$, and adjacent the outer side of the belt $a'$ a side-wall $b^9$, to form a passage-way for the load-carriers, which are usually rectangular boxes, on the belts. In the side-wall $b^9$ there is formed a gap or opening $b^6$ for each station at which boxes are to be discharged, and through which the boxes may pass out of the passageway. The boxes $c$ are of sufficient width to rest on both of the belts and to extend across the longitudinal gap between them, so the central portions of their bottoms will be exposed. A roller $b^7$ is disposed across each gap $b^6$ adjacent the outer edge of belt $a'$ with its axis substantially parallel to said edge to facilitate the lateral discharge of the boxes from the conveyer.

For the purpose of facilitating the lateral displacement of the boxes $c$ from the belts and raising them during the discharging operation, there is provided at each discharge station, a pair of rollers $d$, $d'$ spaced apart and coaxially disposed in a forked bracket $d^2$. This bracket $d^2$ is pivoted or swivelled to rotate horizontally, so the axis of these rollers will extend obliquely across the conveyer to direct the boxes $c$ angularly and transversely to the gap $b^6$. The tops of the rollers $d$ and $d'$ extend slightly above the plane of the top face of the conveyer belts, so that as they are encountered by the box, the latter's front portion will be lifted off the belt. Bracket $d^2$ is mounted to rotate horizontally on a plate $d^3$ which is fixed to a bar $d^4$ which is supported by frame-bars $b^3$. If desired anti-friction balls $d^5$ may be interposed between the bracket $d^2$ and plate $b^3$.

Each box $c$ is provided on one of its sides with a bar $c^4$, the front end of which is inclined, as at $c^5$, and travels in the path of a roller $c^6$, which is mounted in a bracket $c^7$ fixed to the side wall $b^5$ to force the box $c$ transversely towards and into one of the gaps $b^6$ in the side-wall $b^9$. To further displace the box and deflect it transversely through the gap $b^6$, each box is provided, adjacent its front edge, with an upwardly extending lug $c^8$ which is adapted to strike the outer side of an outwardly curved or inclined track $c^9$ which is carried by suitable depending supports. These devices serve to deflect or move the box transversely off the conveyer belts while the boxes are being carried forwardly by the belts.

In the form of the invention illustrated in Figs. 1 to 3, a device, controlled by the boxes, is provided to automatically swing the rollers $d$, $d'$ horizontally to guide the boxes obliquely and laterally from the conveyer belts, so that the front ends of the boxes will, besides being lifted off the conveyer-belts, be guided obliquely, to facilitate the discharge of the boxes. This device comprises a bar or rail $c^{11}$, secured to one side of the box $c$ with an inclined front edge $e^{12}$; a roller $e$, normally disposed in the longitudinal path of the bar $c^{11}$ and journalled in the forked end of a stem $e'$ which is transversely slidable in a bracket $e^2$ fixed to a frame-standard $b'$; a lever $e^4$, fulcrumed at $e^5$ on the bracket $e^2$ and having its upper end pivotally connected to the outer end of the stem $e'$; a link $e^6$, pivoted to the lower end of the lever $e^4$, and a longitudinally extending arm $e^7$ rigid with the bracket $d^2$ in which the rollers $d$, $d'$ are journalled, and to which the link $e^6$ is pivoted, as at $e^8$. A stop $e^9$ limits the inward movement of stem $e'$ and roller $e$ so that the latter will be normally positioned in the path of bar $c^{11}$. A spring $e^{10}$ is applied to retract the rollers $d$, $d'$ and their shifting device into their normal position, so the rollers will rotate in the direction of travel of the boxes and belts when the boxes, which are not to be discharged, are passing over the rollers.

In practice the conveyer systems are usually adapted to selectively discharge the boxes at different stations along the belt. For this purpose, the bars $c^4$ and $c^{11}$, with which the boxes are provided, are disposed at different heights on the boxes, as indicated by dotted lines in Fig. 3, so they will clear the rollers $c^6$ and $e$, except at the particular station at which the boxes are to be discharged. At each station the rollers $c^5$ and $e$ are correspondingly positioned to coact with bars $c^4$ and $c^{11}$ respectively of the series to be discharged at the respective stations.

The operation will be as follows: Assuming the belts $a$ and $a'$ to be constantly driven, boxes $c$ placed thereon will move longitudinally with the belts. As the box approaches a gap $b^6$, at which it is to be discharged, its bar $c^{11}$ will engage roller $e$ and shift it laterally and outwardly so that stem $e'$, lever $e^4$, link $e^6$, and arm $e^7$, will be shifted to swing the lifting rollers $d$, $d'$ horizontally so their axes will extend obliquely across the table before the front end of the box encounter rollers $d$, $d'$. When the front end of the box engages the rollers $d$, $d'$, it will be raised off the belts so that only its rear edge will rest on the belts. As the inclined end $c^5$ of the bar $c^4$ encounters the rollers $c^6$, which occurs approximately as the front end of the box encounters the lifting rollers $d$, $d'$, the box will be initially deflected toward the gap $b^6$, while rollers $d$, $d'$ are positioned to rotate in a direction oblique to the direction of movement of the belt, to facilitate transverse deflection of the box. After the box in its forward movement has been deflected by the roller $c^6$, the lug $c^8$ will pass outwardly of the track $c^{10}$ so that in its continued forward movement, the box will be further deflected while it is supported on the lifting rollers and the belt until the rear end of the box has passed off the latter rollers. At such time, the box will have been deflected transversely sufficiently so that it will bear on the roller $b^7$ and fall out of the conveyer, or, if not the rear end will be carried forwardly by the belt $a'$ until the box is positioned so it will roll over the guide roller $b^7$ and out of the conveyer. The boxes which are not provided with bars $c^4$ and $c^{11}$ for selective operation by and of the rollers $c^6$ and $e$ respectively, will move forward in a straight line with the belts and pass over the lifting rollers $d$, $d'$ which are then positioned to rotate in the direction of travel of the belts.

In the form of the invention illustrated in Figs. 4 and 5, the lifting rollers $d^{20}$, $d^{21}$ for the carrier are mounted in a bracket $d^{22}$ which is connected to swing horizontally on an off-center pivot $d^{23}$ on the stationary bearing plate $d^{24}$. This off-center pivot permits the rollers carried by the bracket $e^{22}$ to swing freely in a horizontal plane responsively to angular movement of the box $c$, initially by the roller $c^6$ and continued by the track $c^{10}$ as it is engaged by lug $c^8$. This deflection occurs before the front of the carrier reaches the castering rollers $d^{20}$, $d^{21}$, so that the box itself will swing the rollers horizontally and obliquely to facilitate the oblique lateral movement of the box and lift it off the belt during the discharging operation, and until a sufficient portion of the box has been deflected to cause it to pass through the discharge gap by gravity onto any suitable guide which may be provided to receive it.

All forms of the invention are usable with a selective switching system, such as is exemplified by Patent No. 1,504,705, in which any desired number of gaps and discharge stations are provided, and in which the boxes and the roller-shifting means are arranged for selective operation by mere change in the elevation of the devices on the carrier and their coacting elements, as exemplified in said patent.

The invention exemplifies an endless conveyer system with means which will automatically lift all but one end of the box out of contact with the upper face of the conveyer belts during the lateral displacement of the carriers, so as to overcome the tearing and cutting which results from the presence of sharp articles or materials on the box or between it and the belts. The swinging of the lifting rollers is controlled by the boxes travelling with the belts. The discharging means is simple in construction.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A conveyer comprising in combination a pair of endless belts spaced apart, a carrier to travel on the belts, and means between the belts, positioned to raise a portion of the carrier off the belt while the carrier is being discharged transversely from the belts.

2. A conveyer comprising in combination a pair of endless belts spaced apart, a carrier to travel on the belts, and a roller between the belts, positioned to raise a portion of the carrier off the belt while the carrier is being discharged transversely from the belts.

3. A conveyer comprising in combination a pair of endless belts spaced apart, a carrier to travel on the belts, and means between the belts, positioned to raise a portion of the carrier off the belt while the carrier is being discharged transversely from the belts, and horizontally rotatable to guide the carrier transversely.

4. A conveyer comprising in combination a pair of endless belts spaced apart, a carrier to travel on the belts, and a roller between the belts, positioned to raise a portion of the carrier while the carrier is being discharged transversely from the belts, and horizontally rotatable to guide the carrier obliquely off the belts.

5. A conveyer comprising in combination a pair of endless belts spaced apart, a load carrier to travel on the belts, and horizontally rotatable means between the belts positioned to lift a portion of the carrier off the belt while the carrier is being discharged transversely, said means being controlled by the carrier, to guide the carrier obliquely from the belts.

6. In combination, a pair of endless belts spaced apart, a load carrier to travel thereon, means between the belts, pivoted to swing horizontally, and positioned to raise the carrier off the belt, and means controlled by the carrier for swinging said means.

7. In combination, a pair of endless belts spaced apart, a carrier to travel thereon, a roller between the belts, pivoted to swing horizontally, and positioned to raise the carrier off the belt, and means controlled by the carrier for swinging said means.

8. In combination, a pair of endless belts spaced apart, a carrier to travel thereon, means between the belts, positioned to raise a portion of the carrier off the belt, means for shifting the carrier transversely, and means controlled by the carrier for swinging the means to guide the lifted carrier transversely.

9. In combination, a pair of endless belts spaced apart, a load carrier to travel thereon, a horizontal turnable roller between the belts, positioned to raise a portion of the carrier off the belt, means controlled by the carrier for swinging said means, and means for shifting the carrier transversely.

10. In combination, a pair of endless belts spaced apart, a load carrier to travel thereon, horizontally turnable means between the belts, positioned to raise the carrier off the belt, means controlled by the carrier for swinging said means, and means to deflect the carrier transversely after said means has been shifted.

11. In a conveyer, the combination of a pair of endless belts spaced apart, load-carriers to travel on the belt, devices to lift the carriers, pivoted to swing horizontally, discharging stations laterally adjacent the path of travel of the carriers, means controlled by the carriers for swinging the devices angularly to the path of travel to deflect the carrier laterally off the belts, and selective devices for deflecting the carriers transversely at the stations.

Signed at Chicago, Illinois, this 21st day of May, 1927.

SAMUEL OLSON.